United States Patent [19]

Frisch, Jr.

[11] 4,374,969

[45] Feb. 22, 1983

[54] ADDITION POLYMERIZABLE ISOCYANATE-POLYAMINE ANAEROBIC ADHESIVES

[75] Inventor: Kurt C. Frisch, Jr., Midland, Mich.

[73] Assignee: The Dow Chemical Company, Midland, Mich.

[21] Appl. No.: 364,830

[22] Filed: Apr. 2, 1982

Related U.S. Application Data

[63] Continuation-in-part of Ser. No. 215,997, Dec. 12, 1980, abandoned.

[51] Int. Cl.$^3$ .............................................. C08G 18/14
[52] U.S. Cl. .................................. 528/69; 156/306.3; 156/307.1; 156/331.4; 526/302; 528/75
[58] Field of Search ................... 528/69, 75; 526/302; 156/306.3, 307.1, 331.4

[56] References Cited

U.S. PATENT DOCUMENTS

| | | | |
|---|---|---|---|
| 2,882,259 | 4/1959 | Graham | 260/45.5 |
| 2,895,950 | 7/1959 | Kriebie | 260/89.5 |
| 3,425,988 | 2/1969 | Gorman et al. | 260/47 |
| 3,505,252 | 4/1970 | Brotherton et al. | 528/75 |
| 3,642,943 | 2/1972 | Noel | 260/859 |
| 3,928,299 | 12/1975 | Rosenkranz et al. | 96/33 |
| 4,018,851 | 4/1977 | Baccei | 204/159.15 |
| 4,043,982 | 8/1977 | O'Sullivan et al. | 526/194 |
| 4,082,634 | 4/1978 | Chang | 204/159.15 |
| 4,233,425 | 11/1980 | Tefertiller et al. | 525/455 |

*Primary Examiner*—Maurice J. Welsh
*Attorney, Agent, or Firm*—Jeffrey S. Boone

[57] ABSTRACT

The reaction product of an ethylenically unsaturated, monofunctional isocyanate, such as isocyanatoethyl methacrylate and a polyamine, is useful as an anaerobic adhesive.

12 Claims, No Drawings

ADDITION POLYMERIZABLE ISOCYANATE-POLYAMINE ANAEROBIC ADHESIVES

CROSS-REFERENCE TO RELATED APPLICATIONS

This application is a continuation-in-part of application Ser. No. 215,997, filed Dec. 12, 1980 now abandoned.

BACKGROUND OF THE INVENTION

The instant invention relates to novel formulations useful as anaerobic adhesives.

Anaerobic adhesives are well known and have been in commercial use for several years. Most anaerobic adhesives are compositions containing a monomer, or combination of monomers, which will polymerize under certain conditions but not under other conditions. Those conditions generally favoring polymerization include the absence of oxygen and, if a redox initiator is used, the presence of metal ions. Oxygen will act as a polymerization inhibitor, and metal ions will act as polymerization promoters.

Consequently, these adhesives find optimal use in situations where they are pressed tight between two metal surfaces, such as between the threads of a bolt and nut. The close fit effectively removes oxygen, and the metal surface provides metal ions. This combination of conditions causes the adhesive to polymerize, and a strong bond results.

Practical formulations often also contain initiators, accelerators, stabilizers, thickeners, plasticizers, diluents, chelating agents and/or adhesion promoters.

SUMMARY OF THE INVENTION

In one aspect, the invention is a novel adhesive formulation utilizing the reaction product of an addition polymerizable isocyanate and a polyamine, wherein the polyamine and the isocyanate are reacted without the presence of a catalyst. In another aspect, the invention is a method of bonding two substrates.

Briefly, the invention comprises an adhesive, comprising the reaction product of an addition polymerizable isocyanate and a polyamine, wherein the polyamine and the isocyanate are reacted without the presence of a catalyst; and a polymerization initiator.

DETAILED DESCRIPTION OF THE INVENTION

The invention includes the reaction product of an ethylenically unsaturated monoisocyanate and a polyamine. This reaction product is then blended with other suitable components, including, but not limited to, an initiator.

Suitable isocyanates include any readily addition polymerizable ethylenically unsaturated monoisocyanate. Examples include vinyl isocyanate and vinylbenzyl isocyanate. Preferred are isocyanato acrylates of the formula:

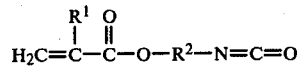

wherein $R^1$ is a hydrogen or a carbon chain of from 1 to 5 carbon atoms and $R^2$ is a carbon chain of from 1 to 7 carbon atoms. More preferred is 2-isocyanatoethyl acrylate. Most preferred is 2-isocyanatoethyl methacrylate (IEM).

The products of polyamines and isocyanates have an unusually long shelf life. Unlike other polyactive hydrogen compounds, polyamines react readily with isocyanate moieties, without the need for added catalyst. It is believed that this lack of catalyst in the amine/isocyanate reaction contributes to the long shelf life of these adhesives.

In this context, "polyamine" is intended to mean any polyactive hydrogen compound wherein an average greater than one of the active hydrogen moieties is provided by amine groups. A polyamine may generally be illustrated by the formula:

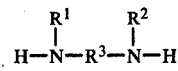

wherein $R^1$ and $R^2$ are each a hydrogen or an organic group and $R^3$ is an organic group. Aminated polyglycols are examples of suitable polyamines. Other examples include ethylenediamine, 1,4-butylenediamine, 1,2- and 1,3 -diaminopropane, 1,7-diaminohexane, diaminobenzene, diaminotoluene, and the like. Interestingly, experiments with Jeffamine ® polyamines showed that polyamines with higher molecular weight produced adducts with lower viscosity.

In formulating an adhesive according to the invention, the isocyanate and polyamine should be reacted in a ratio such that the reactant is capable of being addition polymerized to a substantially solid material. Since suitable polyamines specifically include those compounds having 3 or more active hydrogen moieties per molecule, in defining reaction ratios it is important to specify whether equivalent ratios or molecular ratios are being used. It is generally desirable, from a toxicological standpoint, to have a slight excess of active hydrogen moiety. From an adhesive standpoint, it is desirable to have at least 1 molecule of isocyanate for each molecule of polyamine. An excess of isocyanate is not unduly harmful to the adhesive properties. Preferably, there should be about one equivalent of isocyanate for each equivalent of polyamine.

To be useful as an anaerobic adhesive, the isocyanate-polyamine reaction product requires a free radical generating means capable of initiating addition polymerization of the reaction product. Any free radical generating means such as a peroxygen compound, an azo compound, a UV source and/or a heat source which is suitably employed in the addition polymerization of ethylenically unsaturated monomers is suitably employed in the practice of this invention. Examples of such free radical generating means and conditions of use are set forth in U.S. Pat. No. 3,043,820. Preferred free radical generating means are chemical initiators, especially the peroxygen compounds such as hydrogen peroxide and the entire class of organic peroxides and hydroperoxides such as cumene hydroperoxide and t-butyl hydroperoxide. Such initiators or other free radical generating means are employed in a curing amount, that is, an amount sufficient to cause the desired polymerization of the reaction product. In the case of the hydroperoxides, such are preferably employed in amounts as low as 0.01 weight percent based on the weight of the reaction product, more preferably from about 1 to about 10 weight percent.

Although not required, it is often preferable to employ an accelerator in combination with the initiator. Accelerators are compounds which are believed to assist in the breakdown of the initiator and increase the rate of initiator breakdown. Typical accelerators include tertiary amines such as N,N'-dimethylaniline; N,N'-dimethyl-p-toluidene; triethylamine; and imides such as benzoic sulfimide. Such accelerators may be used in quantities of 0.01 to 15 percent by weight, based on the weight of initiator, with 0.1 to 7 percent being preferred.

Metal ions are particularly effective and useful accelerators. While metal ions may be specifically added to the composition, a trace amount will possibly be present as an impurity. In any event, if the adhesive is applied to a metal substrate, the substrate will provide the metal ion source. The application of the adhesive to a metal is particularly advantageous in that it delays the breakdown of the initiator until the adhesive is actually being used. Examples of effective metal ions include $Cu^+$, $Fe^{++}$, $Cr^{++}$ and $V^{++}$. The metal ions need be present only in catalytic (trace) amounts.

Because the aforementioned initiators or combination of initiator and accelerators promote polymerization quite well, it is generally required to employ an inhibitor to prevent premature polymerization. Examples of such inhibitors are antioxidants including phenols such as 2,6-di-tert-butyl-4-methylphenol (Ionol®), quinones such as benzoquinone, hydroquinones and other compounds that are known to inhibit addition polymerization of ethylenically unsaturated monomers.

An effective amount of an inhibitor must be added to render the adhesive commercially useful. An "effective amount" of an inhibitor is an amount which will prevent premature polymerization of the formulation. Excess inhibitor will cause long cure times. Preferably, the inhibitor is a quinone or a hydroquinone which is preferably employed in an amount in the range from about 5 to 10,000 ppm based on the formulation weight, more preferably from about 50 to about 1,000 ppm.

While a free-radical initiator is, in practical terms a requirement, the other components of the initiator system are optional. Some applications will need none or only some of the other ingredients, but others will require all of them.

The adhesive of the instant invention is utilizable in a number of applications. Uses include adhesives and metal impregnation. Specific applications include locking threaded assemblies, sealing threaded, porous and flanged assemblies, strengthening cylindrical assemblies and structural bonding. Substrates to be bonded include metals, plastics, ceramics and glass. Potential medical applications include tooth and bone cementing sealants.

In applications such as locking the threads of steel bolts and nuts, the oxygen which is present in the adhesive is quickly consumed by the initiator, and the physical barrier of the threads prevents the infusion of new oxygen. In other applications or in particular formulations, however, it may be desirable to specifically remove the oxygen from the system. Such removal may be by mechanical means such as a vacuum pump or by chemical means such as an oxygen consuming agent.

Further details of the invention will become apparent in the following examples. In the examples, all percentages are by weight, unless otherwise specified.

PREPARATION OF IEM ADDUCT

IEM-Ethylenediamine Adduct

Ethylenediamene (60.0 g, 2 equivalents active hydrogen) and Ionol® antioxidant (0.15 g) are combined in a reaction vessel. The mixture is at room temperature and IEM (194 g, 1.9 moles) is added over a 1-hour period. The temperature rises to 125° C. The final product is a solid which will not melt at 125° C.

EXAMPLE 1

Shelf Stability of IEM-Polyamine Adduct Formulation

Jeffamine® D400 polyamine, available from Jefferson Chemical Co., (120.24 g, dried over a molecular sieve) is blended with 0.11 g Ionol® inhibitor. The amine is added dropwise to the IEM at a rate such that the temperature of the reaction mixture does not exceed 50° C. An infrared spectograph shows that the reaction is complete. The product is a translucent amber viscous liquid. Accelerated aging tests show the product to have excellent shelf stability.

The procedure is repeated except that the temperature is not allowed to exceed 30° C. The results are similar.

The first reaction product is formulated with 2.0 percent cumene hydroperoxide and 500 ppm Ionol®. When placed in an 82° C. bath, the formulation gels in 20 minutes.

COMPARATIVE EXAMPLE 1

Shelf Stability of IEM-Polyol Adhesive Formulation

IEM (145.2 g) is reacted with tetraethylene glycol (90.0 g) in the presence of 0.235 g zinc octoate and a total of 0.227 g Ionol® and 0.225 g Dabco® (triethylenediamine). As in Example 1, the product is formulated with 2.0 percent cumene hydroperoxide and 500 ppm Ionol®. This formulation gels in less than 3 minutes when placed in an 82° C. bath.

EXAMPLE 2

IEM (94.02 g, 0.6 mole + 1 percent excess) is added to a 500 ml, b 3-necked, round-bottom flask, equipped with a condenser, mechanical stirrer, addition funnel and thermocouple. Jeffamine° D-400 amine (120.24 g, 0.6 mole amine) having Ionol® inhibitor (0.11 g, 500 ppm) dissolved therein is added to the addition funnel. The amine is added dropwise to the IEM at a rate such that the temperature does not exceed 50° C. The addition takes 3 hours, after which the mixture is stirred for 10 minutes, and is then left to sit, unstirred, at room temperature, overnight. The next day, an infrared spectrum shows no insocyanate peaks ($\approx 2275$ cm$^{-1}$), indicating the reaction is complete. The product is an extremely viscous, yellow liquid. When a sample is formulated with an additional 500 ppm Ionol® inhibitor and 2percent cumene hydroperoxide, it gels in 55 minutes when placed into an 82° C. water bath. A sample formulated without the additional inhibitor gels in 20 minutes.

COMPARATIVE EXAMPLE 2

Tetraethylene glycol (38.85 g, 0.2 mole), Ionol® inhibitor (0.05 g) and dibutyltin dilaurate (0.41 g) are combined in a 3-necked, round-bottom flask equipped with a mechanical stirrer, addition funnel, thermocouple and condenser. IEM (62.68 g, 0.4 mole) is placed into the addition funnel and is added dropwise over a period of 3 hours during which the temperature rises to between 45° and 55° C. After the IEM is added, the mixture is stirred an additional 10 minutes and is then allowed to stand, unstirred, overnight at room temperature. The next day, an infrared spectrum showed no isocyanate peak. The product is a clear, viscous, slightly yellow liquid. When a sample is formulated with 2 percent cumene hydroperoxide, it gels in 7.14 minutes when placed into an 82° C. water bath.

What is claimed is:

1. An adhesive comprising:
   (a) the reaction product of:
      (1) an addition polymerizable ethylenically unsaturated isocyanate and
      (2) a polyamine, wherein the reaction between the polyamine and the isocyanate has been carried out in the absence of a catalyst; and
   (b) a polymerization initiator.

2. The adhesive of claim 1 wherein the ethylenically unsaturated isocyanate has the formula:

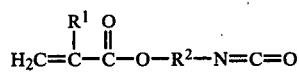

wherein $R^1$ is a hydrogen or a carbon chain of from 1 to 5 carbon atoms and $R^2$ is a carbon chain of from 1 to 7 carbon atoms.

3. The adhesive of claim 2 wherein the ethylenically unsaturated isocyanate is 2-isocyanatoethyl methacrylate or 2-isocyanatoethyl acrylate.

4. The adhesive of claim 1, 2 or 3 wherein the polymerization initiator is a free-radical initiator.

5. The adhesive of claim 4 wherein the polymerization initiator is a peroxygen compound.

6. The adhesive of claim 4 wherein the polymerization initiator is an organic peroxide or hydroperoxide.

7. A method of bonding substrates at a bond site comprising placing:
   (a) the reaction product of:
      (1) an addition polymerizable ethylenically unsaturated isocyanate and
      (2) a polyamine, wherein the reaction between the polyamine and the isocyanate has been carried out in the absence of a catalyst; and
   (b) a polymerization initiator;
   at the bond site so as to form a bond.

8. The method of claim 7 wherein the ethylenically unsaturated isocyanate has the formula:

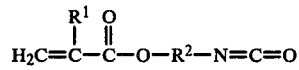

wherein $R^1$ is a hydrogen or a carbon chain of from 1 to 5 carbon atoms and $R^2$ is a carbon chain of from 1 to 7 carbon atoms.

9. The method of claim 2 wherein the ethylenically unsaturated isocyanate is 2-isocyanatoethyl methacrylate or 2-isocyanatoethyl acrylate.

10. The method of claim 7, 8 or 9 including the additional step of removing oxygen from the bond site.

11. The method of claim 7, 8 or 9 including the additional step of applying pressure to the bond site.

12. The adhesive of claim 1, 2 or 3 additionally comprising (c) an inhibitor.

* * * * *